US005591636A

United States Patent [19]
Grass

[11] Patent Number: 5,591,636
[45] Date of Patent: Jan. 7, 1997

[54] MEMBRANE HOLDER

[75] Inventor: George M. Grass, Tahoe City, Calif.

[73] Assignee: Precision Instrument Design, Tahoe City, Calif.

[21] Appl. No.: 505,921

[22] Filed: Jul. 24, 1995

Related U.S. Application Data

[63] Continuation of Ser. No. 138,903, Oct. 18, 1993, abandoned.

[51] Int. Cl.$^6$ .............................. C12M 1/12; C12M 1/34
[52] U.S. Cl. .................... 435/287.1; 435/287.9; 435/297.2; 422/101; 73/38; 73/64.47; 324/450; 324/71.1
[58] Field of Search .................. 435/29, 173.1, 435/173.4–173.6, 240, 241, 287.1, 287.9, 288.2, 297.2, 297.5, 297.1, 304.2, 305.2, 288.4, 303.1, 288.5, 809, 817; 422/99, 101, 102, 104; 73/38, 64.47; 210/321.75, 321.84, 96.2; 204/415, 400, 403; 324/439, 444, 446, 450, 692, 71.1

[56] References Cited

U.S. PATENT DOCUMENTS

| | | | |
|---|---|---|---|
| 3,186,917 | 6/1965 | Gerhardt et al. | 195/1 |
| 3,386,912 | 6/1968 | Lazare | 210/22 |
| 3,508,656 | 4/1970 | Serfass et al. | 210/90 |
| 3,520,803 | 7/1970 | Iaconelli | 210/23 |
| 3,590,634 | 7/1971 | Pasternak et al. | 73/38 |
| 3,963,613 | 6/1976 | Chibata et al. | 210/195 R |
| 4,087,327 | 5/1978 | Feder et al. | 195/1.7 |
| 4,293,399 | 10/1981 | Belanger et al. | 204/415 |
| 4,395,492 | 7/1983 | Rees | 435/283 |
| 4,446,229 | 5/1984 | Indech | 435/1 |
| 4,508,819 | 4/1985 | Rose | 435/1 |
| 4,537,860 | 8/1985 | Tolbert et al. | 435/240 |
| 4,661,458 | 4/1987 | Berry et al. | 435/284 |
| 4,666,853 | 5/1987 | Meserol et al. | 435/290 |
| 4,667,504 | 5/1987 | Hobson | 73/38 |
| 4,686,190 | 8/1987 | Cramer et al. | 435/291 |
| 4,852,389 | 8/1989 | Mayer et al. | 73/38 |
| 4,938,931 | 7/1990 | Cussler | 422/211 |
| 5,139,951 | 8/1992 | Butz et al. | 435/311 |
| 5,141,873 | 8/1992 | Steudle et al. | 73/64.47 |
| 5,160,604 | 11/1992 | Nakamura et al. | 435/32 |
| 5,183,760 | 2/1993 | Sweetana et al. | 435/285 |
| 5,190,878 | 3/1993 | Wilhelm | 435/284 |

OTHER PUBLICATIONS

Grass, George M. et al. "In Vitro Measurement of Gastrointestinal Tissue Permeability Using a New Diffusion Cell," *Pharmaceutical Research*, vol. 5, No. 6, 1988 pp. 372–376.

(List continued on next page.)

*Primary Examiner*—William Beisner
*Attorney, Agent, or Firm*—Townsend and Townsend and Crew LLP

[57] ABSTRACT

The invention provides a compact device of simple construction for holding a membrane in contact with a pair of fluids, one on each side of the membrane. According to the invention, the membrane holder comprises a base and an upper cap, with the membrane held between them. Fluids may be circulated over the surfaces of the membrane. Electrode ports are provided through which electrodes may be placed in proximity to the membrane for measuring or applying electrical potential across the membrane. The membrane holder comprises a base, which includes a lower plate and a center plate secured thereto, and an upper cap, which screws into the base by means of a threaded connection between them. The upper cap may be sealed to provide an enclosed volume for holding one of the fluids or the upper cap may be open to provide an open reservoir for holding the fluid. One or more membrane holders according to the invention may be placed in and held by a specially constructed heater stand. The heater stand includes internal channels for circulating a temperature controlled fluid through the heater stand to transfer heat to or from the base of the membrane holder.

14 Claims, 8 Drawing Sheets

OTHER PUBLICATIONS

"Membrane separations in biotechnology," Library of Congress Cataloging-in-Publication Data, Copyright © 1986, pp. 284–300.

Schoenwald, Ronald D. et al. "Corneal Penetration Behavior of β-Blocking Agents I: Physicochemical Factors," *Journal of Pharmaceutical Sciences*, vol. 72, No. 11, Nov. 1983 pp. 1266–1281.

Ussing, Hans H. et al. "Active Transport of Sodium as the Source of Electric Current in the Short-circuited Isolated Frog Skin," *Acta phys. Scandinav.* vol. 23, Dec. 23, 1950, pp. 110–127.

Product Brochure "Diffusion chamber system for cells cultured on Costar Snapwell™ microporous membranes," Precision Instruments Design. 1994.

MEMBRANE HOLDER

This is a Continuation of application Ser. No. 08/138,903, filed Oct. 18, 1993, now abandoned.

BACKGROUND OF THE INVENTION

1. Field of the Invention

The invention provides apparatus and methods for holding and circulating fluids over a membrane. The invention may find particular use in laboratory studies of the transport and absorption of substances by membranes including biological tissues, cell cultures, and synthetic materials. The invention may also find use in culturing cells in vitro.

2. Description of the Background Art

Hobson, U.S. Pat. No. 4,667,504, issued May 26, 1987, discloses an apparatus for determining in vitro the penetration rate of chemicals across a biological membrane. The apparatus comprises two housings, one holding a reservoir of test chemical, and the other providing a chamber for flowing receptor solution across a membrane held in a membrane holding compartment. The membrane holding compartment comprises a cylindrical depression surrounding an open end of the receptor solution chamber. The receptor solution chamber is tilted slightly with its higher end open to the membrane holding compartment. The tilt prevents bubbles in the receptor solution from becoming stalled or trapped inside the chamber and interfering with the reliability and reproducibility of tests. An inlet bore from the upper surface of the receptor housing leads to a closed end of the chamber near the membrane holding compartment to the upper surface of the receptor housing. The inlet bore is sized smaller than the outlet bore. The depth of the depression forming the membrane holding compartment varies, tapering from a lesser depth at its intersection with the chamber to a greater depth at the outer circumference of the depression. The thus formed truncated cone ensures that a sample biological membrane is stretched taut over the chamber opening by the force fastening the reservoir housing to the receptor solution housing.

The publication of Ussing and Zerahn (Acta Physiol. Scand. 23:110–127 (1951)) describes an apparatus for the determination of sodium flux and short circuit current in frog skin. The device has an area for placement of the skin between two opposing half cells, pressed against the skin by two lucite screws held by steel uprights. The tips of the lucite screws are conical and fit into conical depressions in the center of the ebonite dishes. Buffer solutions are circulated and aerated by air entering through side tubes. Bridges, held in position by pieces of rubber tubing, fit tightly into short celluloid side tubes sealed into the two chambers and these connect to a reservoir system. The device is also fitted with a series of electrodes.

Schoenwald and Huang (J. Pharm. Sci. 72:11 (1983)) discloses a device for mounting of corneas to determine transport of material across corneal tissue. The system is composed of two acrylic plastic blocks. Each block acts as an opposing half cell with an area for the corneal tissue between. The cornea is mounted using a system of three rings, and the ring system with the cornea is positioned in the opening of the blocks and forms a water-tight seal when sufficient lateral pressure is applied to the blocks in a manner similar to that described above by Ussing and Zerahn. Fluid reservoirs on each side of the tissue are mixed with a gas lift mechanism, also similar to Ussing and Zerahn above. Stirring motors mounted on the blocks connect by shafts with blades on the terminus through the block to the reservoir at the tissue face. These blades promote mixing at the tissue surface. The reservoirs are heated by circulation of temperature controlled fluid through channels in the block. The fluid reservoirs and fluid circulation channels for temperature control are within the same contiguous block.

Hidalgo et al. (Gastroenterology 96:736–49 (1989)) disclose a method for the measurement of transport of material across a monolayer formed by cultured cells. Cells are grown in an appropriate medium in a plastic cylinder which is capped at one end with a filter membrane. When the cells reach a confluent monolayer, the cells and the cylinder with attached filter are placed in another larger diameter cylinder with fluid which acts as the receiver solution. Materials placed in the smaller cylinder with the cells are transported across the cells and the filter membrane to the reservoir solution of the larger cylinder.

Grass and Sweetana (Pharm. Res. 5:6 (1988)) disclose a diffusion cell chamber for the measurement of tissue permeability. The apparatus is comprised of at least one chamber with a first and a second volume element, each of which contains a reservoir for fluids and a means to circulate fluids. Also included is a means to retain a membrane separating the first and second volume elements whereby the fluid contained in the reservoir in the first volume element housing could communicate with the fluid contained in the reservoir in the second volume element in the absence of the membrane. Also included are a membrane separating the first and second volume elements, a means to circulate fluid contained in each of the first and second volume elements, and a means to attach the first and second volume elements on a contiguous surface of each of the first and second volume elements in an adjacent facing relationship, wherein the first and second volume element housings are separated from each other at their contiguous surfaces by the membrane. Substantially the same apparatus is disclosed in Sweetana et al, U.S. Pat. No. 5,183,760, issued May 26, 1987.

Co-pending U.S. patent application Ser. No. 08/138,653 (attorney docket no. 14664-2), filed Oct. 8, 1993, now abandoned in favor of U.S. application Ser. No. 08/506,049, filed Jul. 24, 1995, discloses a two chamber membrane holder in which a membrane held between a pair of housings divides the holder into two discrete volumes in which first and second fluids are held and through which those fluids may be circulated.

The disclosure of each of the above publications is hereby incorporated herein by reference.

SUMMARY OF THE INVENTION

The invention provides a compact device of simple construction for holding a membrane in contact with a pair of fluids, one on each side of the membrane. According to the invention, the membrane holder comprises a base, an upper cap, and means for holding the membrane between them. A preferred embodiment includes means for circulating the fluids over the surfaces of the membranes as well as electrode ports through which electrodes may be placed in proximity to the membrane for measuring or applying electrical potential across the membrane.

In the preferred embodiment, the membrane holder comprises a base, which includes a lower plate and a center plate secured thereto, and an upper cap, which screws into the base by means of a threaded connection between them. The upper cap may be sealed to provide an enclosed volume for holding one of the fluids or the upper cap may be open to provide an open reservoir for holding the fluid.

One or more membrane holders according to the invention may be placed in and held by a specially constructed heater stand. The heater stand includes internal channels for circulating a temperature controlled fluid through the heater stand to transfer heat to or from the base of the membrane holder.

DESCRIPTION OF SPECIFIC EMBODIMENTS

The invention provides a compact membrane holder of simple construction. The membrane may be, for example, a thin sheet of biological tissue, a synthetic material, or a layer of cultured cells grown on a suitable support. The invention may find particular use in laboratory studies of the transport and absorption of substances by membranes including biological tissues, cell cultures, and synthetic materials. The invention may also find use in culturing cells in vitro.

Figure 1:
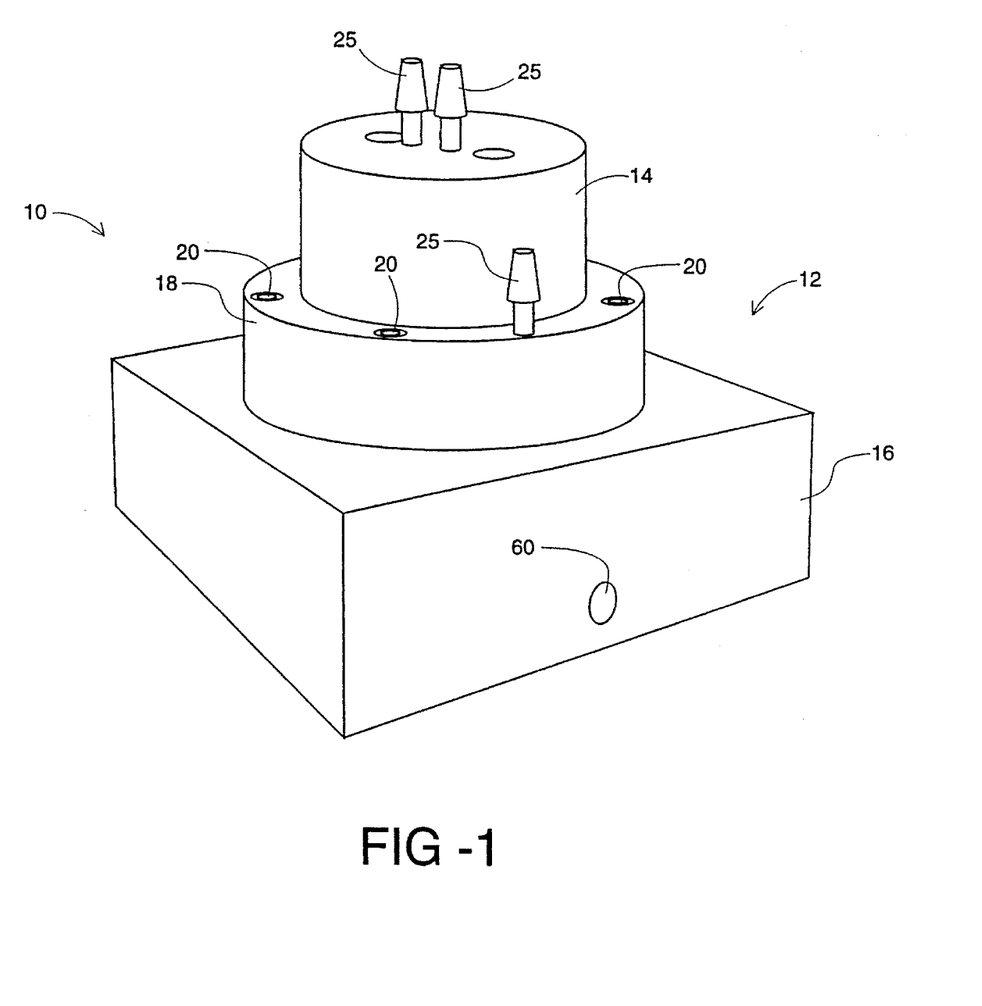
FIG. 1 is a perspective view of a membrane holder according to the invention.

FIG. 1 is a perspective view of the assembled membrane holder. Membrane holder 10 comprises a base 12 and an upper cap 14. Base 12 is assembled from a lower plate 16 and a center plate 18. Circular center plate 18 is secured to rectangular lower plate 16 by means of bolts 20 between the center plate and the lower plate. As will be described more fully below, upper cap 14 screws into base 12 by means of a threaded connection between the upper cap and the center plate. Membrane holder 10 may also include a plurality of fittings 25 for connecting the membrane holder to supplies of particular fluids. FIG. 1 also shows an electrode port 60 through which an electrode may be inserted to measure or apply an electrical potential in the vicinity of the membrane.

The membrane holder may be formed from a variety of materials including plastic, glass or a suitable metal. Generally, it will probably be preferable to form the membrane holder principally from an acrylic plastic or another formable or machinable plastic. Suitable materials will provide a desirable combination of formability, machinability, resistance to staining and corrosion, and suitability for sterilization.

Figure 2:
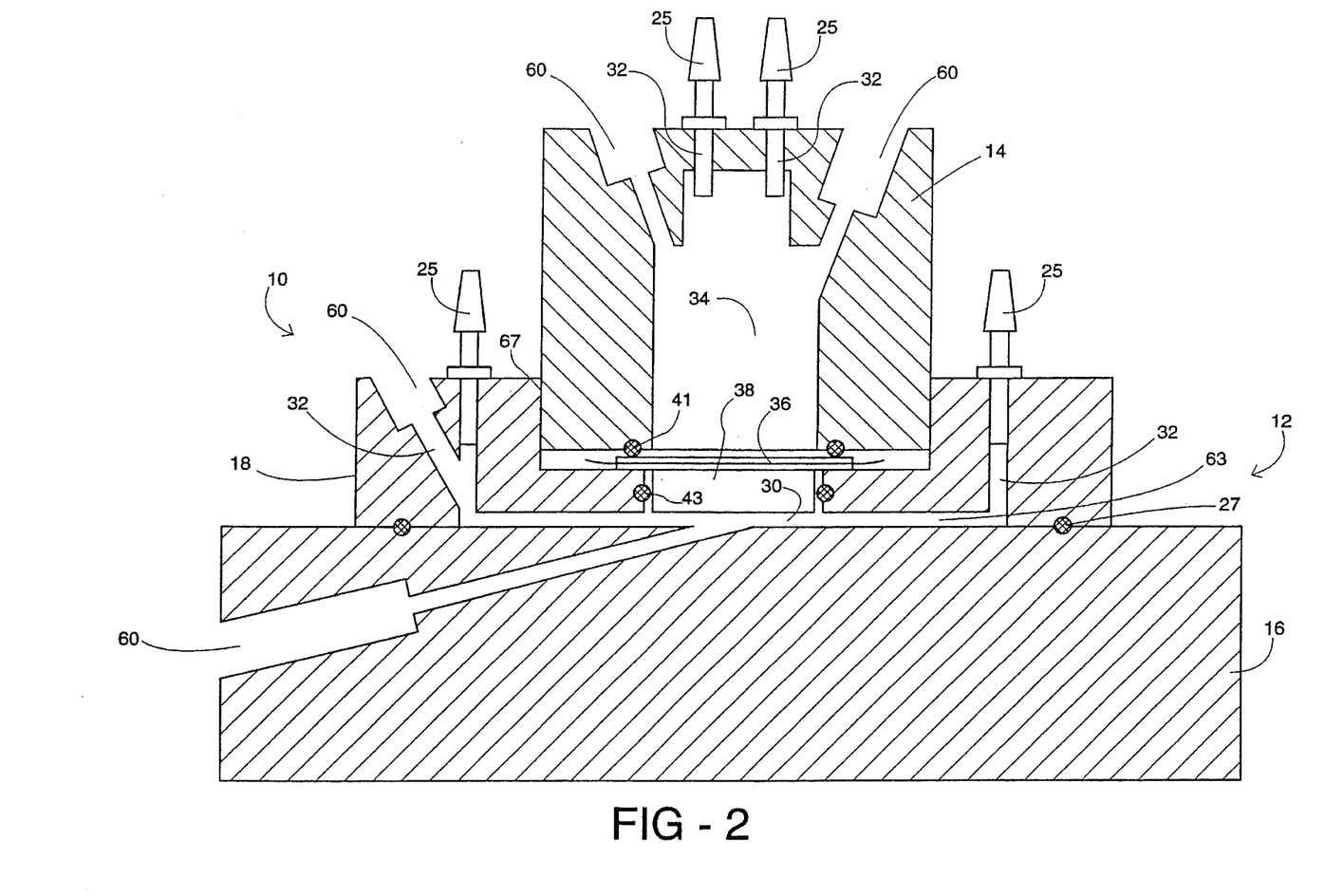
FIG. 2 provides a sectional view through the membrane holder of FIG. 1.

FIG. 2 is a sectional view showing the internal details of the membrane holder of FIG. 1. As noted above, base 12 comprises lower plate 16 and center plate 18 secured thereto. An O-ring 27 provides a seal between the lower plate and the center plate. A gap between portions of the center plate and the lower plate defines a first volume 30 for holding a first fluid.

Passages 32 through center plate 18 provide for fluid communication between the top of the center plate and the first volume. Fittings 25 may be slipped, threaded, press-fit or otherwise inserted into passages 32 for circulating the first fluid, liquid or gas, through the first volume.

Upper cap 14 screws into center plate 18 by means of a threaded connection between them. The upper cap defines and encloses a second volume 34 for holding a second fluid. Fittings 25 inserted into passages 32 in the upper cap provide for fluid communication with the second volume so that the second fluid may be circulated through the second volume.

A membrane 36 is held by an insert 38, which is held in place between center plate 18 and upper cap 14. O-rings 41 and 43 provide fluid seals between the insert and the upper cap and the insert and the center plate respectively.

Figure 3A:
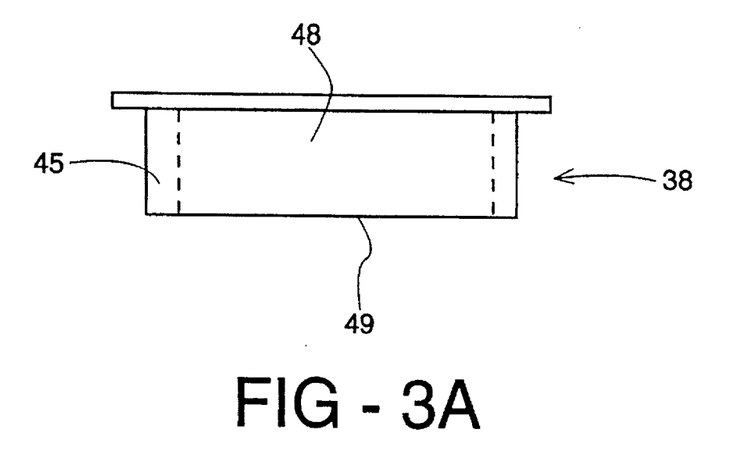
FIGS. 3A and 3B are side views of an insert for use with the membrane holder of FIG. 1.
Figure 3B:
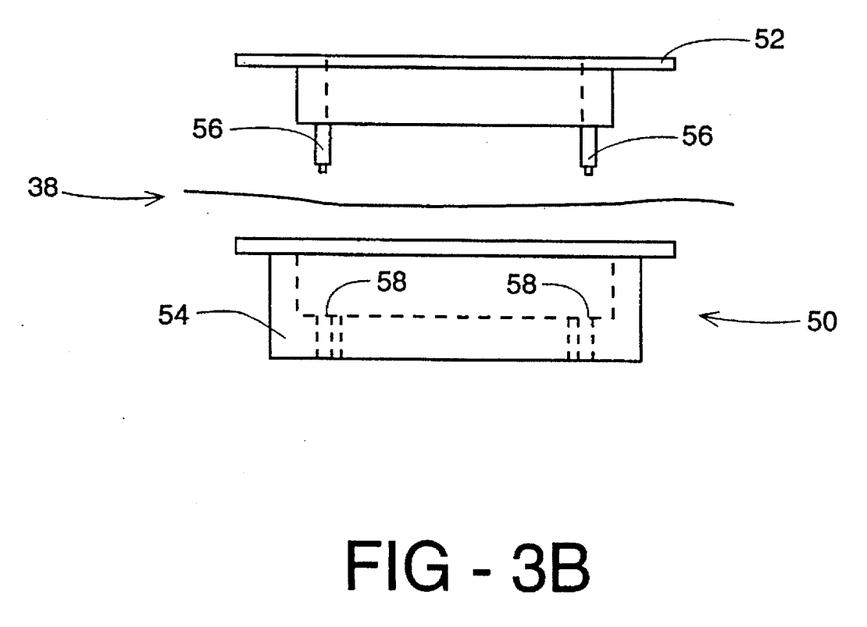

Details of two embodiments of the insert are shown in FIGS. 3A and 3B. The first embodiment, a cell culture insert, is depicted in FIG. 3A. Cell culture insert 45 includes a filter well 48, at the bottom of which is a permeable membrane 49, upon which cells are grown. These cells on the membrane separate the first and second volumes. This type of cell culture insert is sold as the Costar Snapwell® insert, available from the Costar company of Cambridge, Mass.

The second type of insert, a tissue insert, is depicted in FIG. 3B. Tissue insert 50 comprises an upper half 52 and a lower half 54 with a membrane 36 held between them. Pins 56 on the upper half of the insert pierce the membrane and mate with holes 58 in the lower half. When the upper cap is screwed into the base of the membrane holder (see FIG. 2), the membrane is compressed and held securely without being twisted between the two halves of the insert.

Referring again to FIG. 2, electrode ports 60 provide access to the first and second volumes through lower plate 16, center plate 18 and upper cap 14. The electrode ports will normally be closed off by plugs or caps (not shown) inserted or threaded into the electrode ports. These plugs or caps may be removed so that electrodes (not shown) may be inserted into the first and second volumes in the vicinity of the membrane.

In some cases it will be desirable to measure the electrical potential across the membrane. This may be done conveniently by inserting two electrodes into the membrane holder, one on each side of the membrane, and measuring the electrical potential between the two electrodes. In other cases it will be desirable to apply an electrical potential across the membrane. This may be done by applying the desired potential between electrodes lying on each side of the membrane.

Figure 4A:
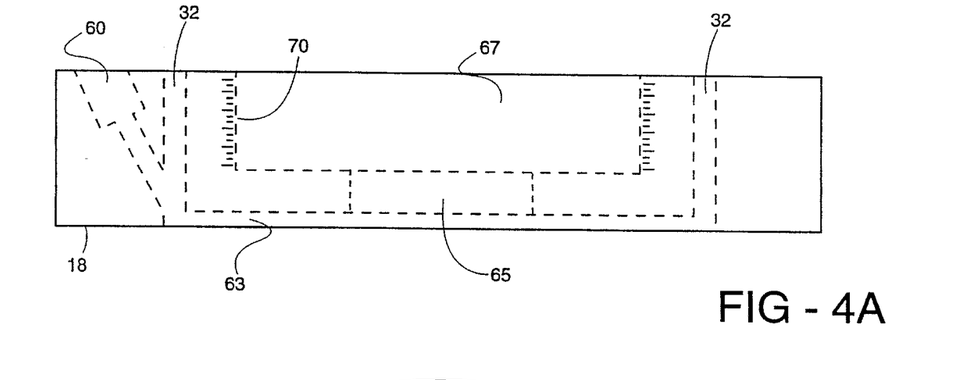
FIGS. 4A and 4B are side and bottom views, respectively, of the center plate of the membrane holder of FIG. 1.
Figure 4B:
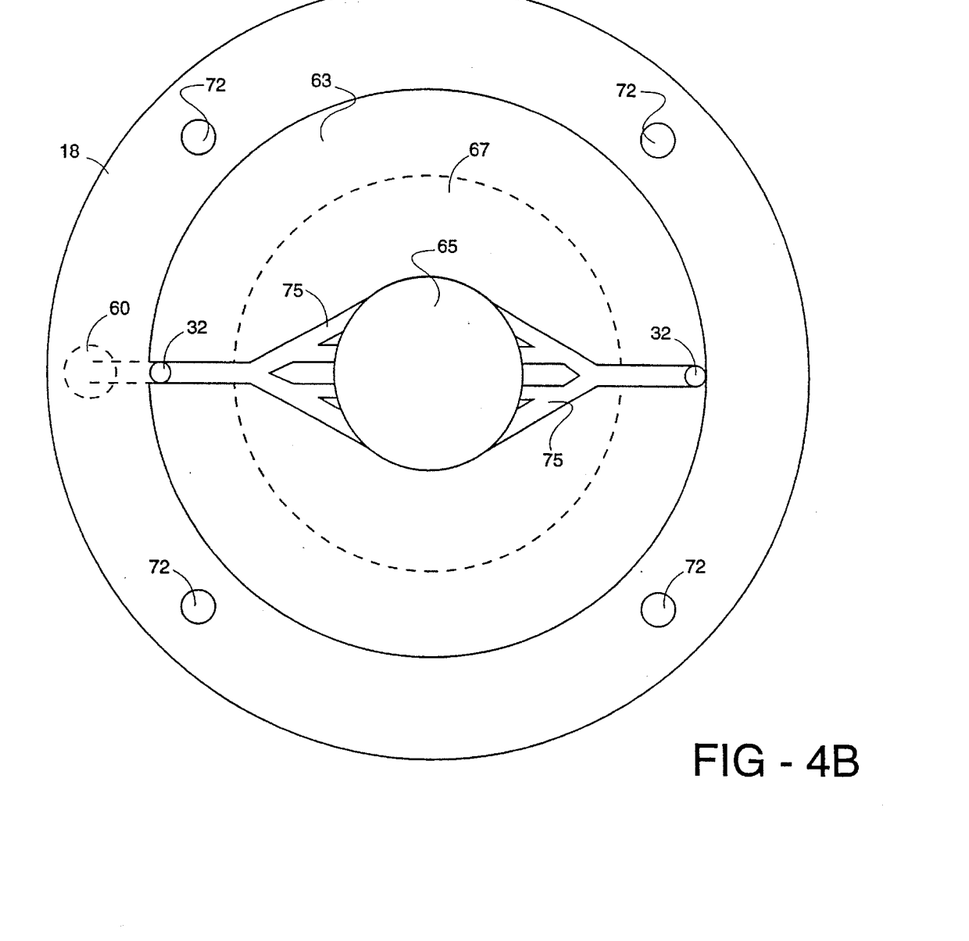

FIGS. 4A and 4B provide side and bottom views, respectively, of center plate 18. These figures depict electrode port 60 and passages 32, all of which are in fluid communication with the first volume in the assembled device. The first volume is defined by a gap between portions of the center plate and the bottom plate. In the embodiment depicted, this gap is defined by a shallow bore 63 bored into the bottom of center plate 18. In the assembled device, a smaller center bore 65 in the center plate receives insert 38 (see FIG. 2) and a receiver 67 bored into the top of the center plate receives the upper cap. Typically, the receiver is provided with internal threads 70 for engagement with external threads on the upper cap to secure the upper cap to the center plate.

FIG. 4B depicts four bolt holes 72 for receiving the bolts 20 that secure center plate 18 to lower plate 16 (see FIG. 1). FIG. 4B also depicts a series of branched channels 75 that connect passages 32 to that portion of the first volume underlying the membrane holding insert. These branched channels ensure that the fluid flow is evenly distributed across the bottom of the membrane.

Figure 5A:
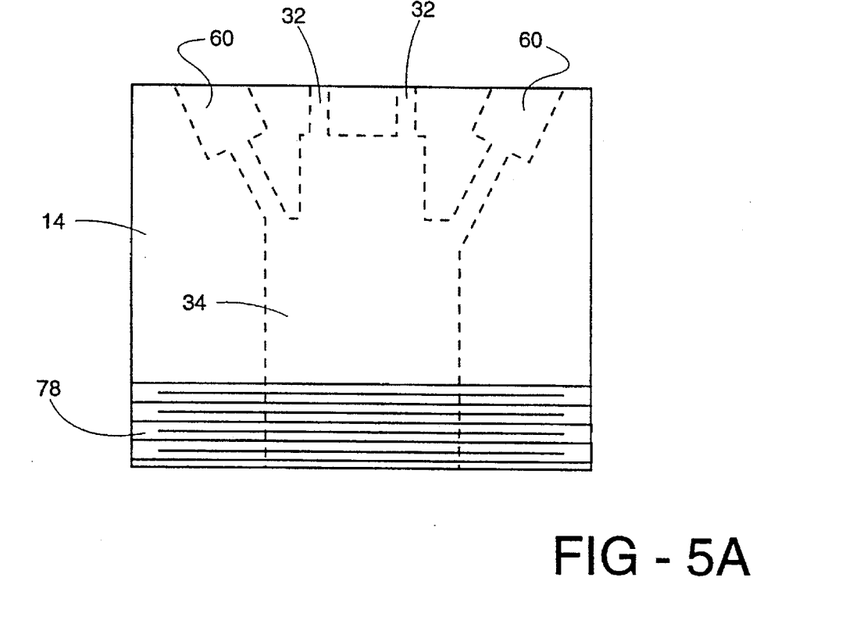
FIGS. 5A and 5B are side and bottom views, respectively, of a first embodiment of an upper cap usable in the membrane holder of FIG. 1.
Figure 5B:
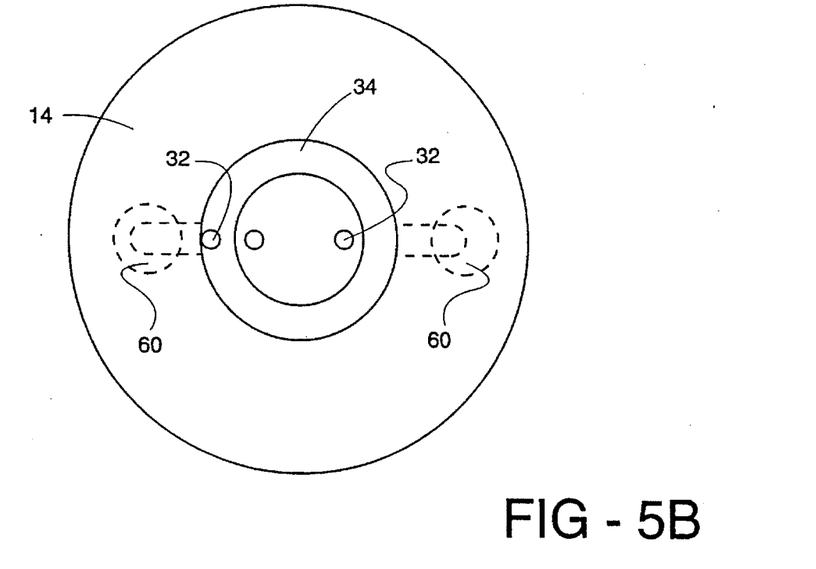

FIGS. 5A and 5B provide side and bottom views of an upper cap 14. This upper cap defines a sealed second volume 34 with electrode ports 60 and passages 32 in fluid communication with the enclosed volume. FIG. 5A shows external threads 78 for engagement with the internal threads of the receiver in the center plate.

Figure 6:
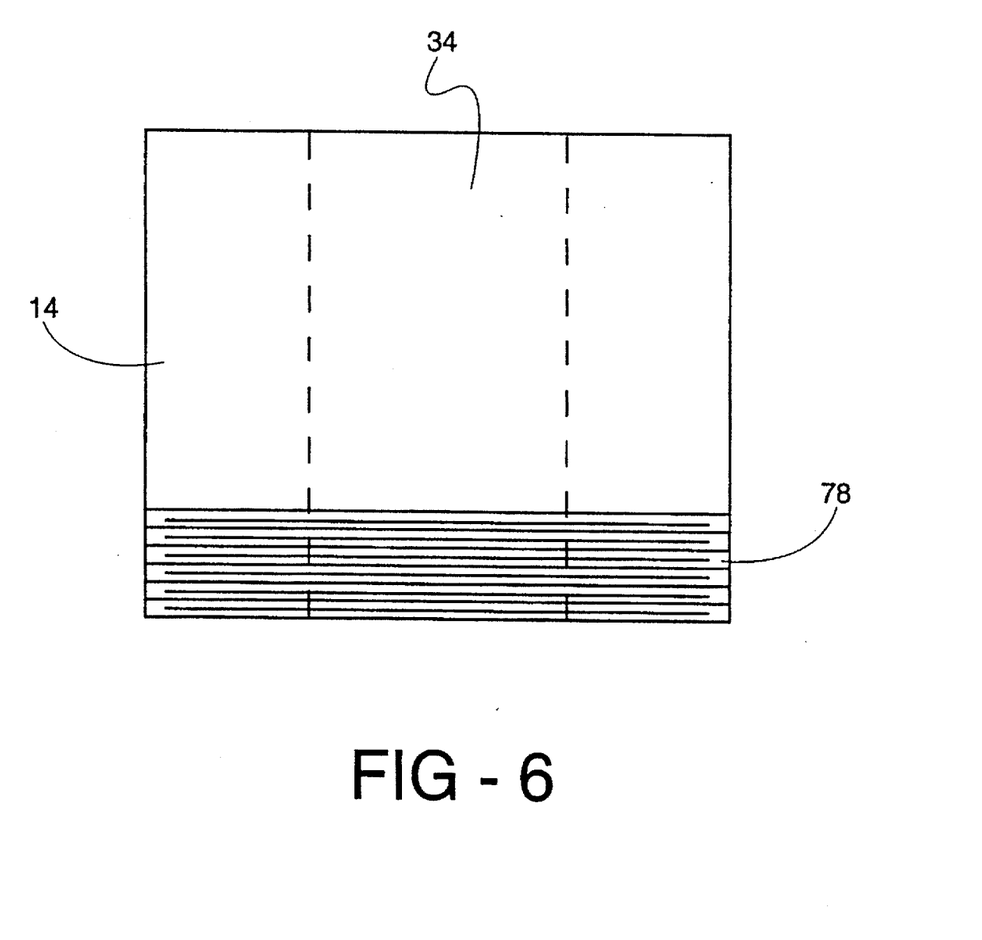
FIG. 6 provides a side view of a second embodiment of an upper cap usable in the membrane holder of FIG. 1.

FIG. 6 depicts an alternative upper cap 14. This upper cap is open at the top so that second volume 34 is in the form of an open reservoir. For some applications, an open reservoir volume may be preferable to the sealed volume provided by the upper cap depicted in FIGS. 5A and 5B.

Figure 7:
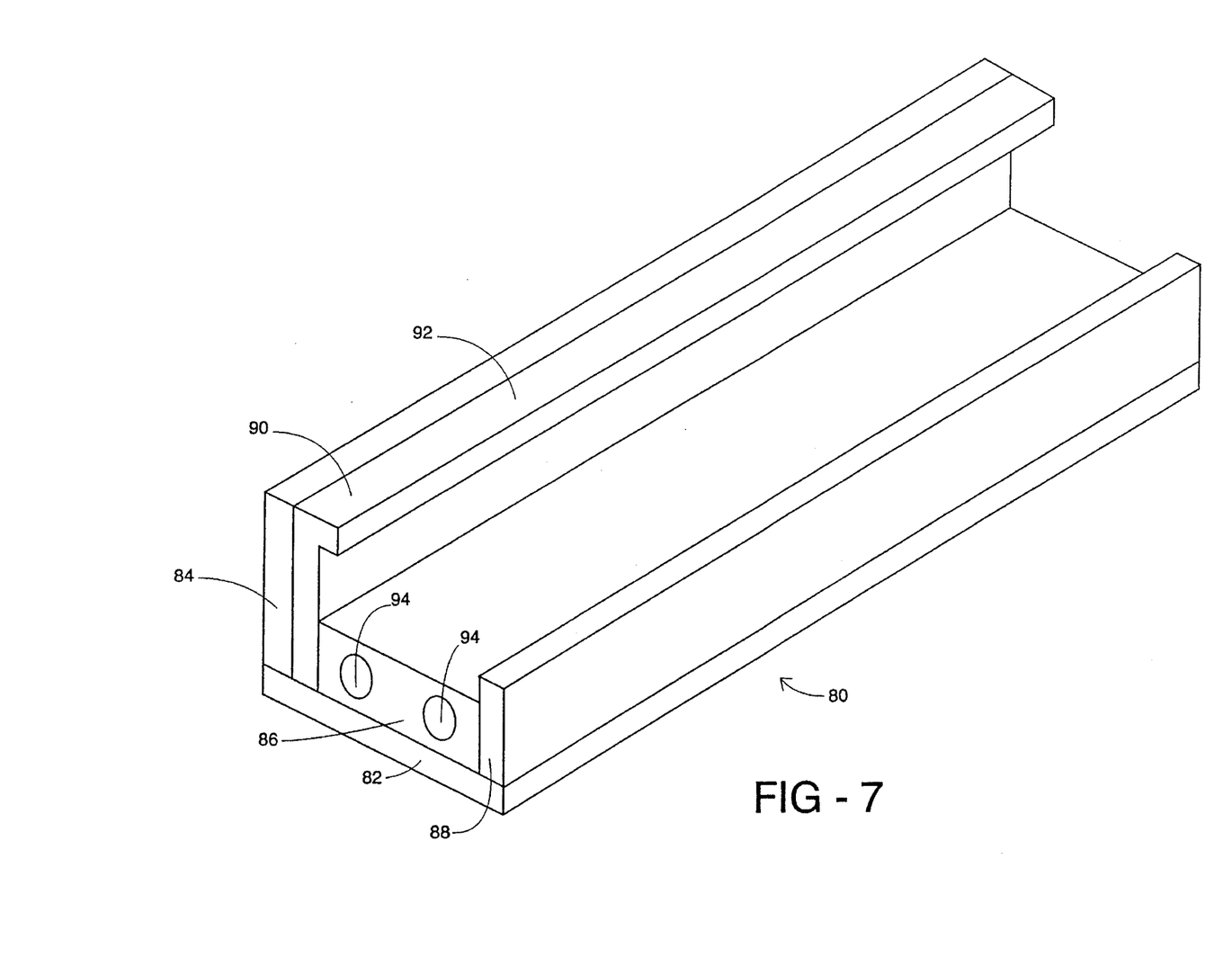
FIG. 7 shows a heater stand usable with one or more membrane holders depicted in FIG. 1.

FIG. 7 depicts a heater stand for use with membrane holders of the type described above. As depicted therein, heater stand 80 comprises a stand bottom plate 82, a stand back plate 84, a heater block 86, a heater front plate 88, and a heater back plate 90. Heater back plate 90 is provided with a lip 92 for retaining the bottom plate of a membrane holder when the membrane holder is slipped into the heater stand. The heater stand is typically long enough so that several membrane holders may be held in it side-by-side. However, a heater stand for a single membrane holder is also possible.

Figure 8:
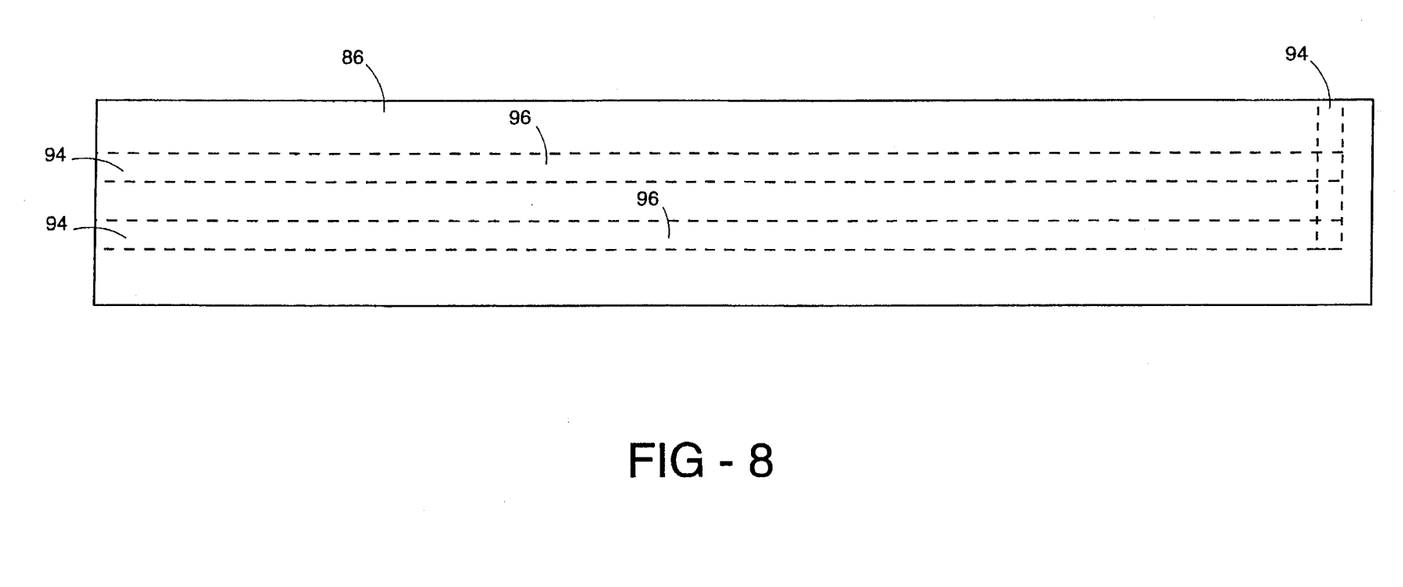
FIG. 8 depicts internal channels for circulating fluid through the heater stand of FIG. 7.

When membrane holders are placed in the heater stand, the bottom plates of the membrane holders rest on the top surface of heater block 86. Fluid connections 94 in heater block 86 provide connections to internal channels for circulating fluid through the heater block. FIG. 8 depicts internal channels 96 in the heater block through which the fluid can be circulated.

By controlling the temperature of the fluid circulating through the heater block, heat can be transferred to or from the membrane holders through the bottom plates of the membrane holders to maintain the membranes at a desired temperature. To facilitate this, the portions of the heater stand that contact the membrane holders should be formed of a material of good thermal conductivity. In particular, aluminum has a good thermal conductivity, is lightweight, is readily machinable, and is therefore a suitable choice for fabricating the heater stand.

Although the heater stand will most commonly be used with relatively warm fluid to transfer heat into the membrane holders, in some cases it may be desirable to transfer heat from the membrane holders. In that case a relatively cool fluid would be circulated through the heater block of the heater stand.

A particular embodiment of the invention has been described in detail for purposes of illustration. Modifications may be made to the embodiment described without departing from the principles of the invention. Therefore, the scope of the invention should be ascertained primarily with reference to the appended claims, along with the full scope of equivalents to which those claims are entitled.

What is claimed is:

1. A device for holding a membrane, the device comprising:

a base comprising a lower plate and a center plate secured thereto, the center plate having an aperture extending therethrough;

an upper cap; and an insert held between the upper cap and the center plate and extending into the aperture, the insert for holding the membrane between the base and the upper cap;

wherein the base defines a first volume for holding a first fluid in contact with the membrane;

wherein the upper cap defines a second volume for holding a second fluid in contact with the membrane; and wherein a fluid path is defined at least in part by a gap between the lower plate and the center plate for continuously circulating the first fluid through the first volume.

2. The device of claim 1, wherein the upper cap defines a fluid path for circulating the second fluid through the second volume.

3. The device of claim 1, wherein the base defines an electrode port providing access to the first fluid and at least two fluid ports in communication with the fluid path, whereby fluid can be circulated through the first volume between the two fluid ports.

4. The device of claim 1, wherein the upper cap defines an electrode port providing access to the second fluid.

5. The device of claim 1, wherein the upper cap is secured to the base by a threaded connection between the upper cap and the base.

6. The device of claim 1, wherein the upper cap is secured to the base by a threaded connection between the upper cap and the center plate.

7. The device of claim 6, wherein the threaded connection comprises external threads on the upper cap and internal threads on the center plate.

8. The device of claim 1, further comprising a seal between the insert and the upper cap.

9. The device of claim 1, wherein the upper cap includes an opening in communication with the second volume.

10. The device of claim 1, wherein the aperture is cylindrical in geometry, and wherein the insert includes a base portion extending into the aperture and a top member held between the upper cap and the base.

11. The device of claim 10, wherein the membrane is on a bottom end of the base portion.

12. The device of claim 10, wherein the base portion and the top member are removably connected to each other, and wherein the membrane is removably held between the base portion and the top member.

13. A system for holding a membrane, the system comprising:

at least one membrane holder comprising:

a base defining a first volume for holding a first fluid in contact with the membrane;

an upper cap defining a second volume for holding a second fluid in contact with the membrane;

an insert for holding the membrane between the base and the upper cap, the insert including an upper portion for engagement between the base and the upper cap and a lower portion extending from the upper portion and into the first volume;

wherein the base includes an electrode port providing access to the first volume and at least two fluid ports in communication with the first volume, whereby fluid can be circulated through the first volume between the two fluid ports; and a heater block adapted to hold at least one membrane holder, the heater block including internal channels for circulating a fluid through the heater block to transfer heat between the heater block and the membrane holder.

14. A device for holding a membrane, the device comprising:

a base defining a first volume for holding a first fluid in contact with the membrane;

an upper cap defining a second volume for holding a second fluid in contact with the membrane;

an insert for holding the membrane between the base and the upper cap, the insert including an upper portion for engagement between the base and the upper cap and a lower portion extending from the upper portion and into the first volume of the base; and wherein the base includes at least two ports for circulating fluid through the first volume, and wherein the upper cap includes at least two ports for circulating fluid through the second volume; and wherein the base includes an electrode port providing access to the first volume.

* * * * *